H. CHRISMAN.
METERING DEVICE.
APPLICATION FILED JAN. 21, 1913.

1,118,922.

Patented Dec. 1, 1914.

3 SHEETS—SHEET 1.

WITNESSES:

INVENTOR.

BY

ATTORNEYS.

H. CHRISMAN.
METERING DEVICE.
APPLICATION FILED JAN. 21, 1913.

1,118,922.

Patented Dec. 1, 1914.

3 SHEETS—SHEET 2.

WITNESSES:

INVENTOR.
Horace Chrisman
BY
Symmes Tweed & Bradley
ATTORNEYS.

H. CHRISMAN.
METERING DEVICE.
APPLICATION FILED JAN. 21, 1913.

1,118,922.

Patented Dec. 1, 1914.
3 SHEETS—SHEET 3.

WITNESSES

INVENTOR
Horace Chrisman
Synnestvedt & Bradley
Att'ys.

UNITED STATES PATENT OFFICE.

HORACE CHRISMAN, OF EDGEWOOD PARK, PENNSYLVANIA, ASSIGNOR TO PITTSBURG METER COMPANY, OF EAST PITTSBURGH, PENNSYLVANIA, A CORPORATION OF PENNSYLVANIA.

METERING DEVICE.

1,118,922. Specification of Letters Patent. Patented Dec. 1, 1914.

Application filed January 21, 1913. Serial No. 743,347.

*To all whom it may concern:*

Be it known that I, HORACE CHRISMAN, a citizen of the United States, residing at Edgewood Park, in the county of Allegheny and State of Pennsylvania, have invented certain new and useful Improvements in Metering Devices, of which the following is a specification.

My invention has relation to metering devices for measuring fluid flows through conduits and particularly to that type of metering apparatus used in water mains wherein two meters are employed, namely, a normal flow meter for measuring normal flows and a tally or proportional meter for measuring abnormal flows, such as occur for example in times of fire service. One of the chief objects of my invention is the provision of improved means for rendering the normal flow meter inoperative under heavy flow conditions when the tally meter is in operation, and for rendering the tally meter inoperative when the normal flow meter is operative.

My invention also contemplates the provision in a proportional metering device of improved means whereby the volume passing through the proportional meter will always be in a substantially constant proportion to the volume passing through the main.

A further object of the invention resides in the provision of improved means for maintaining a differential in the pressure in the apparatus whereby the normal flow meter, which is of the movable type, will remain on its seat in the path of the flow during all normal flows.

Figure 1:
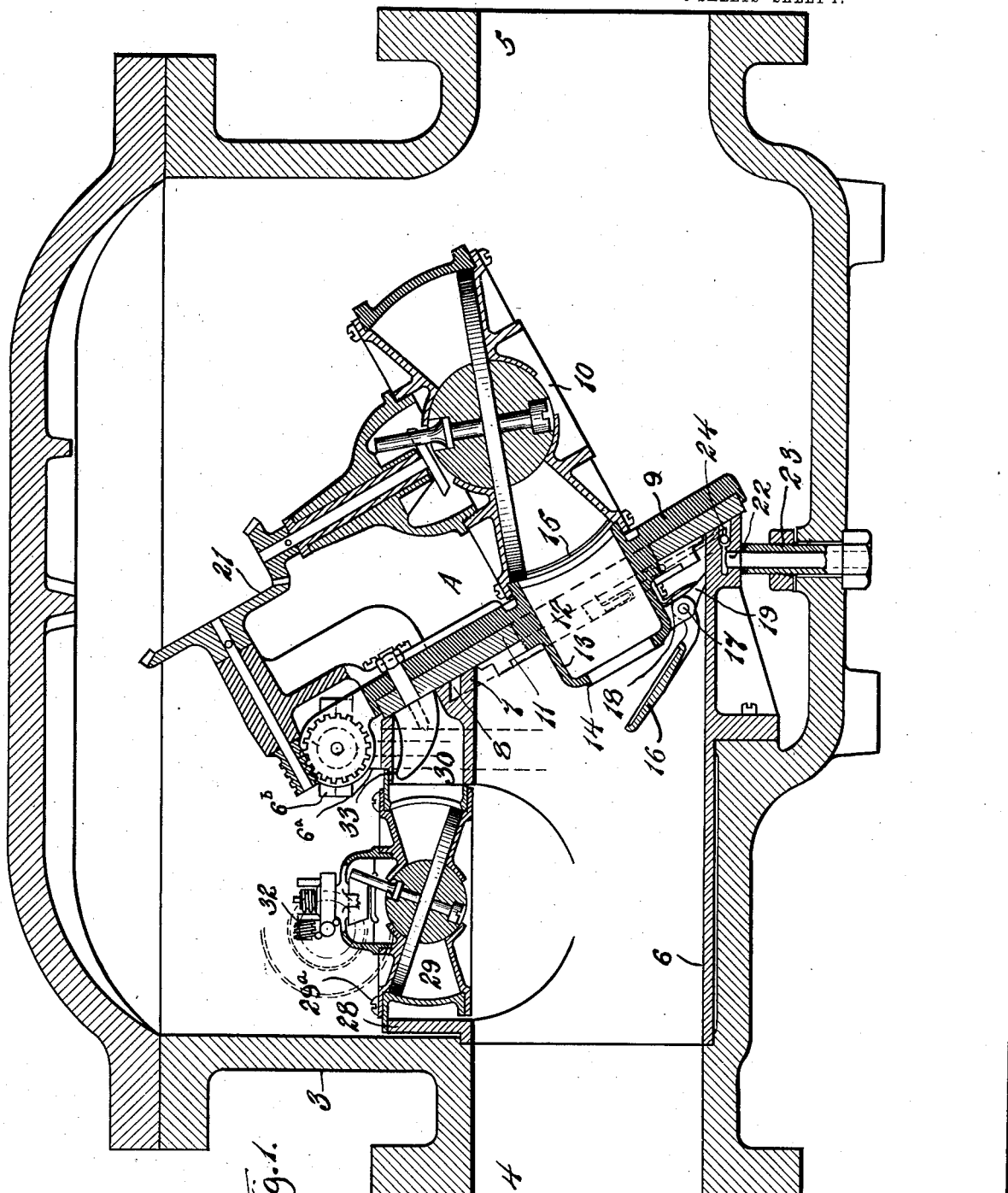
Figure 2:
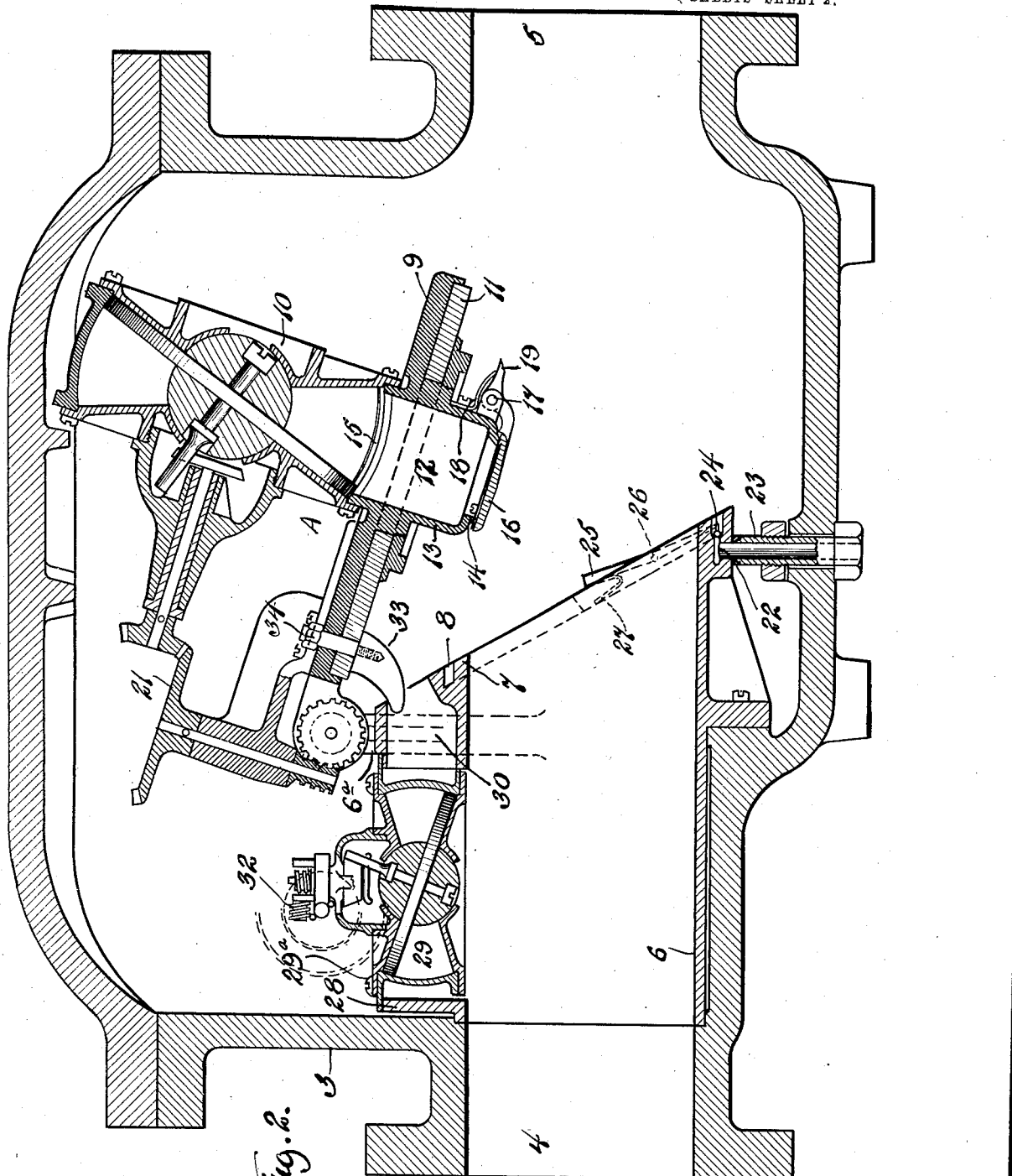
Figure 3:
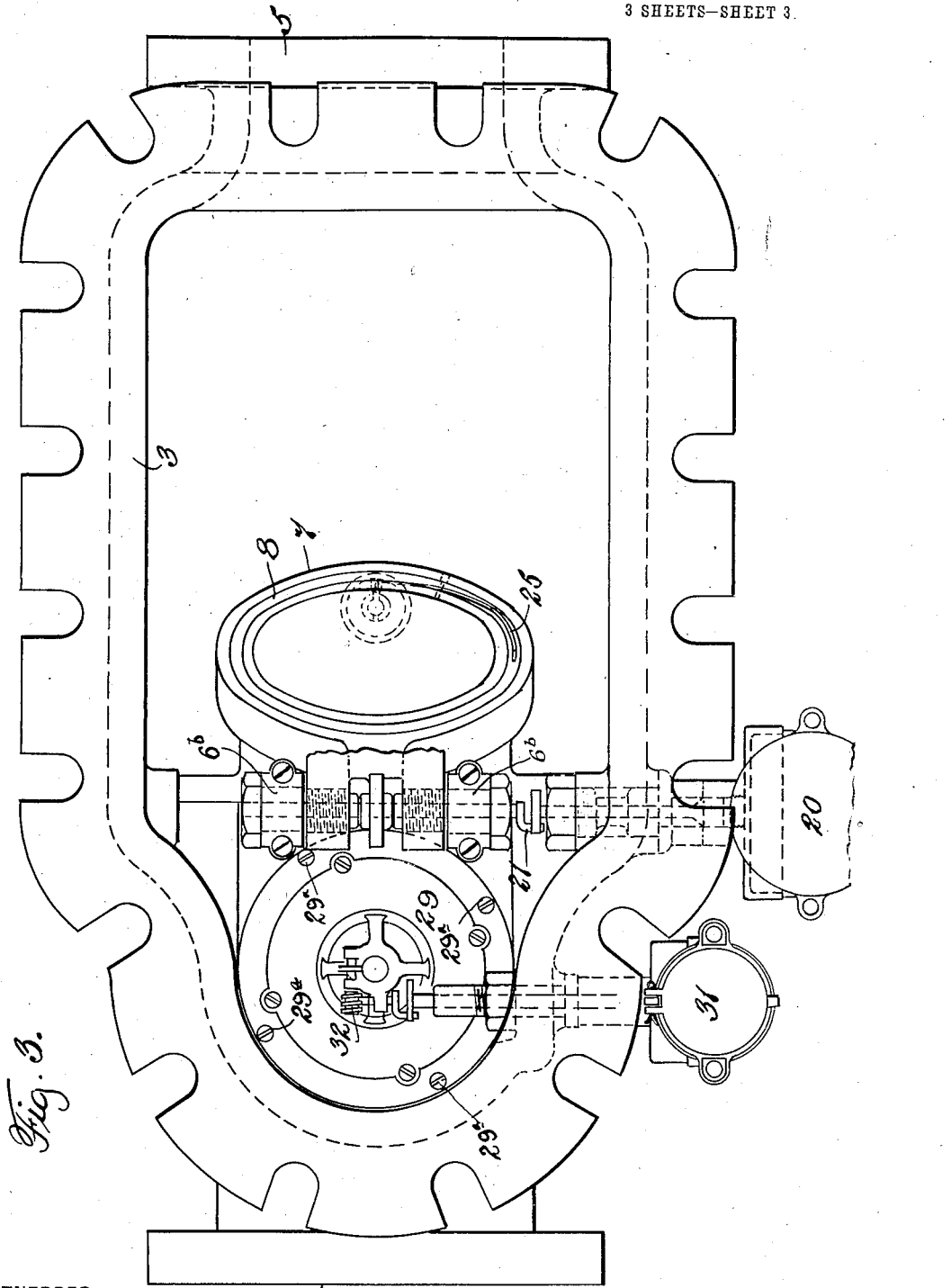

A specific feature of the invention resides in the provision of means actuated by movement of the movable normal flow meter for controlling the volume of water passing through the proportional or tally meter whereby said volume will automatically be maintained in a predetermined constant proportion to the volume passing through the main. These, together with such other objects as may hereinafter appear or are incident to my invention, I attain by means of a construction which I have illustrated in preferred form in the accompanying drawings, wherein:

Fig. 1 is a longitudinal section through the apparatus; Fig. 2 is a similar section showing the parts in different positions; and Fig 3 is a plan view of the device of Fig. 1 with the cover plate of the casing removed and the normal flow meter broken away.

The metering apparatus is mounted in the usual casing 3 which is provided with an inlet opening or port 4, an outlet port 5, the casing being placed in a main so that the ports are in the line of flow through the main. Mounted with the casing adjacent the inlet port 4 is a removable sleeve 6 which may be fastened in any suitable manner and which is provided at its inner end with a sloping valve seat 7 having in its face an annular recess 8, the purpose of which will hereinafter appear.

Hinged to the sleeve 6 adjacent the inner end of the same on brackets 6ª is a combined check valve and normal flow meter A which comprises a disk 9 to which is secured a meter 10 which may be of any preferred type, the one illustrated being of the wabble disk type. The disk 9 is provided with a renewable face 11 which takes against the valve seat 7 as indicated in Fig. 1. In substantially the central portion of the disk I provide a port or passage 12 adjacent the edges of which is an annulus or flange 13 having a valve seat 14. The port 12 communicates at one end with the inlet port 15 of the meter 10 and at the other end with the interior of the sleeve 6, the latter end of the port being controlled by the disk 16 which is pivoted to the flange 13 as at 17 and which when the swinging meter is raised is held in closed position by means of the spring 18 (see Fig. 2). When the meter 10 swings downwardly to close the passage between the ports 4 and 5, the nose 19 on the disk 16 abuts the sleeve 6 and uncovers the port 12. The usual indicator 20 is provided on the exterior of the casing and is operated from the meter disk by the usual gearing 21. It will be understood that the swinging meter normally tends to seat itself by the action of gravity.

In order that the meter shall remain securely seated during all normal flows through the casing, I provide a differential of pressure on the faces of the disk 9. I accomplish this by establishing communication between the recess 8 in the valve seat 7 and the atmosphere by means of the port 22 and the hollow stem 23 which is mounted in the casing at a point adjacent the valve seat. It will be clear that when the parts are in the position indicated in Fig. 1 the recess 8 should be in communication with the atmosphere so that the pressure therein may be less than that within the casing, but that when the parts are in the position indicated in Fig. 2, communication to the atmosphere should be cut off to prevent wasting of the water. Provision for this is made through the valve 24 which controls the port 22. The valve is carried on and operated by the curved arm 25, which lies in the recess 8 and is pivoted to the valve seat as indicated at 26. The valve 24 is held in closed position by means of the spring 27 which tends to force the upper end of the arm 25 outwardly, as seen in Fig. 2. By this construction the port 22 is open when the swinging meter is seated and closed when the meter is in inoperative position, thus establishing and cutting off communication with the atmosphere automatically at the proper times.

Referring now to the proportional metering apparatus for measuring heavy or abnormal flows through the main, it will be seen that the upper portion of the sleeve casting 6 has a flanged portion 28 in which is mounted a proportional meter 29 in such manner that its inlet opening communicates with the interior of the sleeve. The proportional meter may be of any preferred type. The outlet of this meter communicates with a port 30 formed in the sleeve casting and opening in the face of the valve seat 7. When the normal flow meter is seated, the port 30 will of course be closed, and when the flow through the main is sufficient to unseat the normal flow meter the port will be uncovered and water will pass through the proportional meter and the port 30. An indicating device 31 is operated from the meter by the usual gearing 32. In order that indicating device 31 shall accurately register the flow through the main on any desired proportional basis, I provide a means for controlling the volume of water passing through the proportional meter and port 30, said means comprising a valve member 33 which is substantially pyramidal in shape and which is secured to the disk 9 by means of the stud 34. The valve member 33 is adapted to project within and close the port 30 when the normal flow meter is seated and the port opening is more or less restricted, depending on the angular position assumed by the normal flow meter, the shape of the valve member 33 being such that the volume permitted to pass through the port 30 will always be in a predetermined substantially constant proportion to the volume passing through the main. When the main passage is completely uncovered by the normal flow meter, the port 30 is substantially unrestricted.

Briefly stated the operation of the entire apparatus is as follows: During all normal flows through the main, the valve and meter parts are in the position indicated in Fig. 1, that is to say, the normal flow meter valve is seated; the disk 16 is in open position uncovering the port 12; the valve 24 establishes communication between the recess 8 and the atmosphere; and the port 30 is closed by the valve member 33. In this position of the parts there is no flow through the proportional meter and the flow through the main passes through the port 12 and the normal flow meter and out through the outlet 5. The indicator 20 registers the amount of the flow.

When the flow is heavy, as in time of fire service, the normal flow meter is swung from its seat; the valve port 12 is immediately closed by the disk 16, thereby rendering the normal flow meter inoperative; the port 22 is closed by the valve 24; and the valve member 33 uncovers the port 30, thereby placing the proportional meter in operation, the indicator 31 registering the flow.

From the foregoing it will be apparent that the proportional flow meter is effectually rendered inoperative during all normal flows within the capacity of the normal flow meter, and that the normal flow meter is rendered inoperative automatically upon the occurrence of abnormal flows, during which the proportional meter is operative. It will also be seen that regardless of the volume passing through the main passage, the quantity passing through the tally meter is automatically maintained in direct proportion thereto.

An advantage incident to having both the normal flow meter and the tally meter mounted on the sleeve is that the entire metering device can be assembled and then inserted bodily into the casing, or can be removed therefrom bodily. The construction also enables me to remove either of the meters singly without necessarily disturbing the rest of the apparatus. In removing the normal flow meter, the plates 6ᵇ are taken off, and in removing the tally meter, the screws 29ᵃ are taken out.

Having thus described my invention and illustrated its use, what I claim as new and desire to secure by Letters Patent is the following:

1. A metering device comprising in combination a main, a casing in the main, a bodily movable meter in the casing for measuring normal flows, a proportional meter, and means actuated by the normal flow meter in its movement for automatically proportioning the flow through the proportional meter to the flow through the main.

2. A metering device comprising in combination a main, a casing in the main, a bodily movable meter in the casing for measuring normal flows, a proportional meter, and a valvular device actuated by the normal flow meter in its movement for automatically proportioning the flow through the proportional meter to the flow through the main.

3. A metering device comprising in combination a main, a casing in the main, a bodily movable meter in the casing for measuring normal flows, a proportional meter, and a valvular device carried by the movable meter in its movement and adapted to automatically proportion the flow through the proportional meter to the flow through the main.

4. A metering device comprising in combination a main, a casing in the main, a normal flow meter, a proportional meter, one of said meters being bodily movable, and means for automatically proportioning the flow through the proportional meter, said means being actuated on movement of the movable meter.

5. A metering device comprising in combination a main, a casing in the main, a swinging normal flow meter, a proportional meter, the casing being provided with a port in communication with said proportional meter, and a valvular device carried by the normal flow meter for controlling said port.

6. A metering device comprising in combination a main, a casing in the main, a swinging normal flow meter, a proportional meter, the casing being provided with a port in communication with said proportional meter, and a tapering valve member carried on the normal flow meter for controlling said port and automatically proportioning the flow through the proportional meter to the flow in the main.

7. A device of the class described comprising a main, a casing in the main, a seat in said casing, a bodily movable member adapted to take against said seat, a recessed portion in said seat in communication with the atmosphere whereby a differential of pressure within the casing is provided, and a valve cutting off communication with the atmosphere, said valve being opened by the movable member when the latter seats.

8. A device of the class described comprising a main, a casing in the main, a seat in said casing, a bodily movable member adapted to take against said seat, a recessed portion in said seat in communication with the atmosphere whereby a differential of pressure within the casing is provided, and a spring-held valve cutting off communication with the atmosphere, said valve being opened by the movable member when the latter seats.

9. A metering device comprising in combination a main, a casing in the main, a swinging meter in the casing movable into and out of the line of flow and having a valve disk, a seat for the disk, a neck on said disk, provided with a port for establishing a direct path of flow to the meter, a valve closing said port and an abutment on the valve adapted to take against the casing and open the valve when the swinging meter seats.

10. A metering device comprising in combination a main, a casing in the main, a swinging meter in the casing movable into and out of the line of flow and having a valve disk, a seat for the disk, the disk being provided with a port therein for establishing a direct path of flow to the meter, a valve closing said port, and an abutment on the valve adapted to take against the casing and open the valve when the meter seats.

11. A metering device comprising in combination, a casing and a sleeve therein carrying a normal flow meter and a tally meter, whereby the said normal flow meter and tally meter may be removed by removal of the sleeve.

In testimony whereof I have hereunto signed my name in the presence of the two subscribed witnesses.

HORACE CHRISMAN.

Witnesses:
LETITIA A. MYERS,
ARCHWORTH MARTIN.